Sept. 8, 1970 J. K. BOWKER ET AL 3,527,540

COLOR CONCENTRATION DISCRIMINATORS

Filed May 8, 1967

United States Patent Office 3,527,540
Patented Sept. 8, 1970

3,527,540

COLOR CONCENTRATION DISCRIMINATORS

John Kent Bowker, Marblehead, Jerry Glenn Hughes, Waltham, and Charles Marshall Stasey, Westwood, Mass., assignors to Itek Corporation, Lexington, Mass., a corporation of Delaware Filed May 8, 1967, Ser. No. 636,734
Int. Cl. G03b *27/78;* H01s *3/50*
U.S. Cl. 356—175 19 Claims

ABSTRACT OF THE DISCLOSURE

Apparatus for discriminating a concentration of a color on a film containing many colors including a photomultiplier for sensing each of the three primary color components, red, blue and green, radiated from contiguous portions of the film, a logarithmic converter responsive to each of the photomultipliers for determining the amount of the color component present as a function of the density of the color component independent of the intensity level, a first differencing amplifier responsive to the red and green density signals and a second differencing amplifier responsive to red and blue density signals, for producing red-green difference signals and red-blue difference signals, a differentiator responsive to each of the differencing amplifiers for determining whether the primary color densities represented by the difference signals change at successively sensed portions, and level detectors responsive to the differentiators for indicating positive and negative changes from a predetermined level.

CHARACTERIZATION OF INVENTION

Apparatus for discriminating a concentration of a color on an object containing a plurality of colors including means for sensing color components of colors at contiguous portions of the object, means, responsive to the means for sensing, for determining the amounts of the color components at each of the portions, and means, responsive to the means for determining, for detecting changes in the amounts of the color components at successively sensed ones of the portions, said apparatus being adaptable to prevent subject failure due to overcompensation by the color balancing means in a color printer machine.

SUMMARY OF INVENTION

This invention relates to apparatus for discriminating a concentration of a single color on an object having a plurality of colors, and more particularly to such an apparatus usable in an automatic color printer machine to prevent subject failure.

Conventional automatic color printing machines sense the total amount of each primary color recorded on an original film or negative and adjust the light used to expose the printing stock to the original accordingly. On the assumption that all random scenes in nature comprise equal components of the primary colors red, blue and green, an especially workable assumption when dealing with aerial photography, such machines consider a color-balanced scene to be neutral or gray and control the exposure of light accordingly. If the green component is more abundant than the red and blue components, for example, a magenta filter is used to reduce the green component. This method of operation is workable when the total amounts of the primary color components are drawn nearly equally from all the many items in the scene.

However, when there is a large area of a single color in the scene, the primary color components or other components included in that color will often have higher totals than the components not included in the color. But, when the filters controlling the light source are applied according to the component totals, they bias all the light used to expose the entire scene. Thus, a scene containing a portion of blue water would have a yellow cast resulting from the machine having overcompensated by removing the blue in an attempt to provide a color-balanced or gray print. This is generally referred to as subject failure.

Conventionally, human operators are used at great cost and loss of time to individually inspect each original and manually instruct such machines to provide against unwarranted color compensation.

Accordingly, it is a primary object of this invention to provide an apparatus for automatically discriminating a concentration of a single color on an object having a plurality of colors.

It is a further object of this invention to provide such an apparatus which operates quickly, inexpensively, and without the aid of a human operator.

It is a further object of this invention to provide such an apparatus which is usable in a color printer machine to prevent color components contributed by concentrations of a single color in a scene on a film from causing overcompensation for that color and impairing the color balance of the entire scene.

It is a further object of this invention to provide such an apparatus which is usable in a color printer machine to prevent any particular one of the primary color components, red, green, and blue, contributed by a concentration of a single color in a frame of film from causing the color filter system to overcompensate the light used to expose that frame for that particular color component resulting in subject failure of the print produced from that frame.

The invention is accomplished by apparatus for discriminating a concentration of a color on an object containing a plurality of colors including means for sensing color components of colors at contiguous portions of the object, means, responsive to the means for sensing, for determining the amounts of the color components at each of the portions, and means, responsive to the means for determining, for detecting changes in the amounts of the color components at successively sensed ones of the portions.

In preferred embodiments the invention may be adapted for use in a color printer machine having automatic color balancing means to automatically prevent overcompensation by the color balancing means that may result in subject failure.

DISCLOSURE OF PREFERRED EMBODIMENT

Other objects, features and advantages will occur from the following disclosure of a preferred embodiment of the invention, taken together with the attached drawings, in which.

Figures 1, 2:
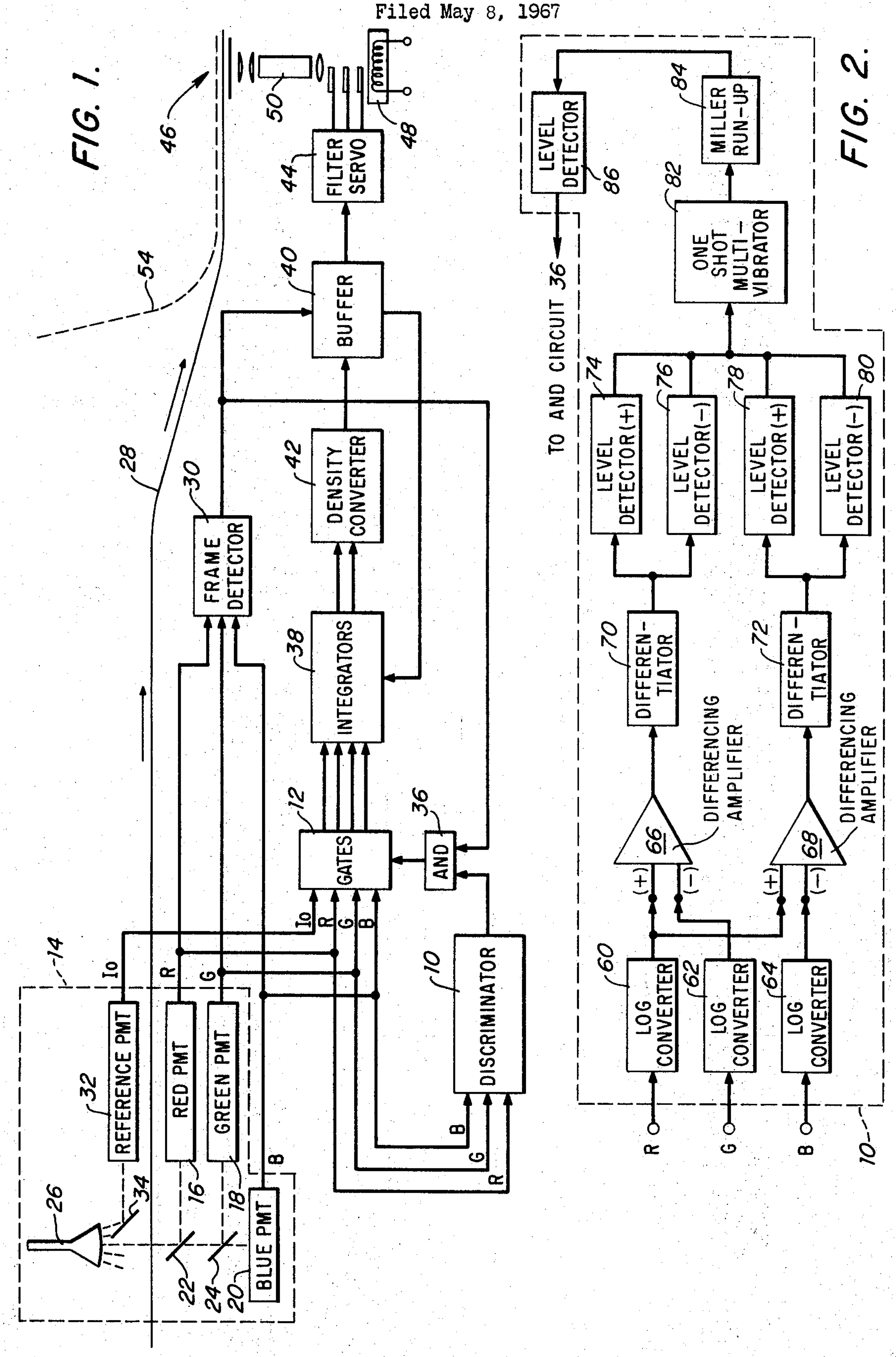
FIG. 1 is a diagram of a color printer machine using the color concentration discriminator of this invention.
FIG. 2 is a detailed diagram of a color concentration discriminator according to this invention.

The color concentration discriminator 10 may be used in a color printer machine, FIG. 1, to control passage of red, green, and blue intensity signals through gates 12. Intensity signals are produced in photometer 14 by red photomultiplier 16, green photomultiplier 18, and blue photomultiplier 20, each of which is sharply tuned to its respective primary color component of the light from dichroic filters 22 and 24. Filter 22 reflects red light and passes blue and green, while filter 24 reflects green and passes blue. The light is produced by a flying spot scanner cathode ray tube (CRT) 26 operating at approximately 150 cycles per second, providing a one-line raster which sweeps contiguous points on original film 28 in both directions transverse to its direction of travel.

The signals from photomultipliers 16, 18, and 20 are delivered to frame detector 30, and to gates 12 as well as to discriminator 10. A white light reference signal developed by reference photomultiplier 32 from the 5% of the light from CRT 26 reflected by mirror 34 is also delivered to gates 12. Gates 12 only pass these signals when both inputs to AND circuit 36 are present indicating a frame is being scanned and no concentration of a single color has been detected.

Throughout the application "color" is used to indicate all colors including all hues and shades and combinations. For example, a film of the desert has many "colors" within the broad meaning of color used here: there are many "colors" of tan reflected by sand just as there are many "colors" of blue reflected by the ocean. "Color component" has been used to indicate the elements in terms of which the sensed colors are to be analyzed. The color components need not be only the primary colors, red, blue, and green. For the system may as well be designed to sense browns and purples or only tans or only pinks, for example.

Information relating to the intensity of the primary color components and the reference signal is gated to integrators 38 where it is accumulated during the scanning of each frame or section of film 28. At the completion of the scanning of a frame, a signal from buffer 40 may be used to move the four intensity signals stored over a scan period from integrators 38 to density converter 42 where each of the primary color component signals is compared with the reference signal to provide digital signals indicative of the total densities of each of the primary color components in that frame.

Buffer 40 coordinates the density signals from converter 42 with the speed and number of frames per foot of the particular film being scanned and presents the color component density information for a particular frame to filter servo 44 during the period when that frame is at printing station 46. Here the cyan, magenta and yellow filters are interposed between light source 48 and lens system 50 by servo 44 to subtract the correct amounts of red, green and blue, respectively, from the light directed at the film. Thus, the light used to expose print stock 54 through film 28 is balanced without danger of overcompensation as a result of concentration of a single color.

Discriminator 10 is shown in more detail in FIG. 2 where the signals from photomultipliers 16, 18, and 20 representing the intensities of the red, green, and blue light components are submitted to logarithmic converters 60, 62, and 64, respectively. These converters transpose the color component intensity characteristics of the film to their logarithmic functions, i.e. density characteristics, so that the amount of the color component may be detected regardless of the intensity level. The amount of the color components in low intensity signals have the same relative weights as corresponding amounts of the color components in high intensity signals. Log converters 60, 62, and 64 may utilize a high gain amplifier in combination with an emitter-base junction of a transistor to provide an exponential characteristic which when placed in the feedback path of the high gain amplifier results in a logarithmic function. See J. S. Gibbons and H. S. Horn, A Circuit With Logarithmic Transfer Response Over Nine Decades, I.E.E.E. Transactions on Circuit Theory, CT–11(3): 378–384 (September 1964).

The signals from the converters are combined or summed algebraically in differencing amplifiers 66 and 68 in order to reference the signals so that the relative change in the color components may be detected. This is accomplished by applying the red component signal to the non-inverting input of each amplifier 66 and 68 and one of the other color component signals to the inverting input: amplifier 66 receives the green component signal at its inverting input while amplifier 68 receives the blue component signal at its inverting input. Thus, the output of amplifier 66 is a function of the amount of the red component present with respect to the green component and vice versa or it may be characterized as the red-green difference. Similarly amplifier 68 delivers a signal which is a function of the red-blue difference.

These difference signals are received by differentators 70 and 72 which produce signals at the color change borders which are positive for positive-going signals (toward red) and negative for negative-going signals (toward green or blue). And these color change signals are derived from both sides of a color change border, where such border is extensive enough to encounter the beam sweeps in both directions.

The output of each differentiator 70 and 72 is fed to a plus and a minus level detector 74 and 76, and 78 and 80, respectively. Both plus and minus detectors are required to detect changes in red-green and in red-blue differences.

Each of the detectors is typically a Schmitt trigger circuit set to trigger at a signal level representative of a predetermined color density change. Satisfactory results are obtainable when these circuits trigger at signal levels representative of a color density change in the neighborhood of 0.05 density. The outputs of the detectors are summed upon reaching one shot multivibrator 82 which also provides pulse shaping.

Miller circuit 84 maintains an output for a specified period upon receiving an input pulse, and if a second input pulse is received during the period when an output pulse is being produced the output pulse will be extended for another period from the time of receipt of the second input pulse. Because of this ability to continue to accept data during the time it is on, the Miller circuit was used instead of other types of circuits which ignore input pulses while they are on. For a more detailed explanation of a typical Miller circuit see Samuel Seely, Electron-Tube Circuits, 2nd Ed., 1958, McGraw-Hill Book Company, Inc., New York.

The output of Miller circuit 84 is delivered to level detector 86, which may be a Schmitt trigger circuit. Thus, if a significant change in relative amounts of the color components has been sensed, level detector 86 sends a pulse to AND circuit 36 which together with a frame pulse causes AND circuit 36 to enable gates 12 to pass the signals present through to integrators 38. The signals present at gates 12 are instantaneously processed in discrimintor 10 and provide signals at level detector 86 when a significant change in the color component amounts is indicated, enabling gates 12 to pass the signals there present. Since discriminator 10 operates instantaneously, except for the slight delay of multivibrator 82, the signals present at gates 12 are analyzed by discriminator 10 to control their own passage through gates 12.

In operation, as the flying spot scan provided by CRT 26 sweeps back and forth over contiguous portions of travelling film 28, red, green, and blue component intensity signals generated in photomultipliers 16, 18 and 20, respectively, are delivered to log converters 60, 62, and 64, respectively. Logarithmic conversion of the intensity signals changes them to density signals so that amounts of the color components at low intensity levels are weighted equally with corresponding amounts of color compnents at high levels.

The red and green cmponent density signals are combined in differencing amplifier 66 through opposite polarity inputs. The output signal is a continuous representation of the density of the red-green component differences of the area being traversed by the flying spot scanner. Similarly the red and blue component density signals are combined in differencing amplifier 68 through opposite polarity inputs. This output signal is a continuous representation of the red-blue component color differences of the areas being sensed. These two signals will vary as the red and blue and red and green components of the sensed areas vary.

For example, a single scan sweep traversing a frame of film showing a forest in fall as the leaves are turning and a neighboring lake, may cause differencing amplifier 66 to produce a signal indicating a varying, high density red-green difference and amplifier 68 to produce a signal indicating a fairly constant low density red-blue difference, for the forest would have only very low blue components which would hardly vary. During the portion of the scan over the lake the red-green differences would be constant and of very low density, while the red-blue differences would be very high and quite constant. Therefore, during the forest part of the scan, differentiator 70 would produce many signals indicative of color change borders which would indicate a change in color component density of 0.05 density, depending upon whether the difference indicates more red or more green, respectively, a sufficient change to trigger detectors 74 or 76. Signals from these detectors would then pass through circuits 82, 84, and 86 to gate the waiting signals to integrators 38. The lack of red-blue difference changes prevents differentiator 72 from generating any signals capable of switching gates 12 during this portion of the scan.

As the scan passes over the lake the red-green differences are of very low density and too constant to produce an output from differentiator 70 sufficient (0.05 density) to trigger detectors 74 or 76. The red-blue component signal is now very high and is negative, indicating a high blue content. If this heavily blue area were permitted to enter into color balance computations a large amount of yellow filtering would be introduced and would produce a print having low blue content leaving the print with a yellow cast: subject failure. But the red-blue difference, though high, is constant; with a steady input differentiator 72 produces no output and detectors 78 and 80 are not triggered. Thus, there is no signal to circuits 82, 84, and 86 and no pulse to AND circuit 36 to switch on gates 12: the information gathered by this scan relative to the lake is left waiting at gates 12 and will be lost as further information is delivered to gates 12. The heavy blue concentration is thereby discriminated and prohibited from entering into any further computations.

It is apparent that this discriminator invention is usable for more than preventing subject failure, or preventing subject failure in an automatic printer color balancing machine. The invention is applicable to discriminate colors on any object, not just on film or pictures, and may be used for accentuating certain areas of intelligence information on film. For example, in a jungle scene the invention could be used to detect only the shadow areas, so that the shadow area where covert activity is more likely would be presented in greater detail. Or, if the interest is in underwater coastal regions, the system could be designed to favor only subtle blue changes, thereby emphasizing color changes caused by sand banks and shoals.

The invention may be used with film which records sonic, ultra-violet, infra-red or any other electromagnetic radiations which are capable of being recorded as a detectable image on a dye layer of the film: three levels of infra-red radiation may be recorded on a film and be reproduced on a color print in terms of the three primary colors red, blue, and green.

Other embodiments will occur to those skilled in the art and are within the following claims.

What is claimed is:

1. Apparatus for analyzing the color content of a scene, recorded on at least one medium, having areas, comprised of a plurality of increments, of relatively rapid color change and areas of relatively constant color comprising:

(a) scanning means for scanning the scene including an illumination source to illuminate said at least one medium and photodetecting means for detecting color components of colors at increments of the scene and for rendering electrical signals indicative of the color components.

(b) discriminator means, responsive to said electrical signals, for determining whether at least one color change of a predetermined significance exists between adjacent increments of the scene including detector means for determining wether a predetermined change in said electrical signals has occurred between adjacent increments of the scene;

(c) means, coupled to said photodetecting means and including gating means responsive to said detector means, for providing electrical output signals indicative of the sums of color components from only those areas of the scene which contain a color change of a predetermined significance; and (d) utilization means responsive to the output signals from said providing means for utilizing said output signals.

2. Apparatus for analyzing the content of the color component information of a scene, recorded on at least one medium, having areas, comprised of a plurality of increments, of relatively rapid color change and areas of relatively constant color including:

(a) scanning means for scanning the scene including an illumination source to illuminate said at least one medium and photodetecting means for detecting color component information in the scene and for rendering electrical signals indicative of the color components of colors in the scene;

(b) analyzing means, responsive to said electrical signals, for analyzing the content of the color components of the scene and for rendering output signals indicative of the analysis including summing means for summing each color component of the scene;

(c) means responsive to said electrical signals for preventing said analyzing means from analyzing color component information from areas of the scene having relatively constant color including, discriminator means for determining whether at least one color change of a predetermined significance exists between adjacent increments of the scene including detector means for determining whether a predetermined change in said electrical signals has occurred, and gating means responsive to said detector means for gating said electrical signals in response to an output signal from said detector means; and (d) utilization means responsive to said output signals from the analyzing means for utilizing said output signals.

3. Apparatus as set forth in claim 1 wherein said photodetecting means includes means for detecting a first primary color, a secondary primary color, and a third primary color.

4. Apparatus as set forth in claim 3 wherein said detector means includes a first differential means for subtracting a signal representing a second primary color from a signal representing a first primary color to provide a first differential electrical signal, and second differential means for subtracting a signal representing a third primary color from said signal representing said first primary color to provide a second differential electrical signal, and monitoring means for monitoring changes in each of the differential signals for a predetermined significant change.

5. Apparatus as set forth in claim 4 wherein said discriminator means includes logarithmic converter means for accepting said electrical signals from said photodetector means and for proivding logarithmic signals indicative of the amount of each color component detected regardless of the brightness level at which each color component is detected.

6. Apparatus as set forth in claim 1 wherein said discriminator means includes logarithmic converter means for accepting said electrical signals from said photodetector means and for providing logarithmic signals indicative of the amount of each color component detected regardless of the brightness level at which each color component is detected.

7. Apparatus as set forth in claim 1 wherein said utilization means includes processing means for producing an altered scene, recorded on at least one medium.

8. Apparatus as set forth in claim 7 wherein said photodetecting means includes means for detecting a first primary color, a secondary primary color, and a third primary color.

9. Apparatus as set forth in claim 8 wherein said detector means includes a first differential means for subtracting a signal representing a second primary color from a signal representing a first primary color to provide a first differential electrical signal, and second differential means for subtracting a signal representing a third primary color from said signal representing said first primary color to provide a second differential electrical signal, and monitoring means for monitoring changes in each of the differential signals for a predetermined significant change.

10. Apparatus as set forth in claim 9 wherein said discriminator means includes logarithmic converter means for accepting said electrical signals from said photodetector means and for providing logarithmic signals indicative of the amount of each color component detected regardless of the brightness level at which each color component is detected.

11. Apparatus as set forth in claim 1 wherein said utilization means includes comparator means responsive to said output signals for making a comparison utilizing each of said output signals.

12. Apparatus as set forth in claim 1 wherein said utilization means includes processing means for producing an altered scene, recorded on at least one medium.

13. Apparatus as set forth in claim 12 wherein said photodetecting means includes means for detecting a first primary color, a secondary primary color, and a third primary color.

14. Apparatus as set forth in claim 13 wherein said detector means includes a first differential means for subtracting a signal representing a second primary color from a signal representing a first primary color to provide a first differential electrical signal, and second differential means for subtracting a signal representing a third primary color from said signal representing said first primary color to provide a second differential electrical signal, and monitoring means for monitoring changes in each of the differential signals for a predetermined significant change.

15. Apparatus as set forth in claim 14 wherein said discriminator means includes logarithmic converter means for accepting said electrical signals from said photodetector means and for providing logarithmic signals indicative of the amount of each color component detected regardless of the brightness level at which each color component is detected.

16. Apparatus as set forth in claim 15 wherein the processing means includes means for producing the altered scene from the scene by exposing the altered scene to radiation, from a radiation source, which has been transmitted through the scanned scene, and including spectral control means responsive to said comparator means for controlling the spectral content of radiation which exposes the altered scene, thereby providing a desired color-balanced altered scene.

17. Apparatus as set forth in claim 16 wherein said monitoring means includes differentiator means for indicating a change in the amount of each color component at successively detected increments of the scene.

18. Apparatus as set forth in claim 17 wherein said monitoring means further includes level detector means responsive to said differentiator means for indicating a predetermined significant color change.

19. Apparatus as set forth in claim 18 wherein said level detector means includes positive and negative level detector means for indicating said predetermined significant color change when the output of the differentiator means changes either positively or negatively.

References Cited

UNITED STATES PATENTS

| | | | |
|---|---|---|---|
| 3,029,691 | 4/1962 | Goddard et al. | 178—5.2 X |
| 3,051,841 | 8/1962 | Crossfield et al. | 250—214 X |
| 3,110,761 | 11/1963 | Allen et al. | 178—5.2 |
| 3,161,108 | 12/1964 | Modney | 355—38 |
| 3,184,307 | 5/1965 | Letzer | 355—38 X |
| 3,218,387 | 11/1965 | Farber | 178—5.2 X |
| 3,282,190 | 11/1966 | Neale | 355—38 |
| 3,381,612 | 5/1968 | Lecha | 178—5.2 X |

FOREIGN PATENTS

| | | |
|---|---|---|
| 928,658 | 6/1963 | Great Britain. |
| 722,947 | 12/1965 | Canada. |

OTHER REFERENCES

Bartleson et al.: "Exposure Determination Methods for Color Printing: The Concept of Optimum Correction Level," J. SMPTE, 65, April 1956, pp. 205-211.

Gundelfinger et al.: "A High-Speed Color Printer," Phot. Sci. & Engr., 41 (3), May–June 1960.

RONALD L. WIBERT, Primary Examiner

R. J. WEBSTER, Assistant Examiner

U.S. Cl. X.R.

250—216, 226; 355—38; 356—222, 226